United States Patent
Bal et al.

(10) Patent No.: US 11,630,033 B2
(45) Date of Patent: Apr. 18, 2023

(54) TESTING DEVICE FOR AN AIRBAG MODULE

(71) Applicant: MOTHERSON INNOVATIONS COMPANY LIMITED, London (GB)

(72) Inventors: Erkan Bal, Geisenfeld (DE); Alexander Bader, Ihlerstein (DE); Lukas Kuegel, Pfoerring (DE); Konrad Forsthofer, Rohr (DE)

(73) Assignee: MOTHERSON INNOVATIONS COMPANY LIMITED, London (GB)

( * ) Notice: Subject to any disclaimer, the term of this patent is extended or adjusted under 35 U.S.C. 154(b) by 0 days.

(21) Appl. No.: 17/154,488

(22) Filed: Jan. 21, 2021

(65) Prior Publication Data
US 2021/0231531 A1 Jul. 29, 2021

(30) Foreign Application Priority Data

Jan. 27, 2020 (EP) .................................... 20153928
Jun. 4, 2020 (EP) .................................... 20178227

(51) Int. Cl.
*G01M 17/007* (2006.01)
*G01L 5/00* (2006.01)
*G01M 7/08* (2006.01)

(52) U.S. Cl.
CPC ....... *G01M 17/0078* (2013.01); *G01L 5/0052* (2013.01); *G01M 7/08* (2013.01)

(58) Field of Classification Search
CPC .. G01M 17/0078; G01M 7/08; G01M 99/008; G01M 17/007; G01L 5/0052; G01L 17/00; B60R 21/215; B60R 21/16
See application file for complete search history.

(56) References Cited

U.S. PATENT DOCUMENTS

2012/0074675 A1* 3/2012 Hayashi ............ B60R 21/21656
280/728.3

FOREIGN PATENT DOCUMENTS

| CN | 202710330 | U |   | 1/2013 |            |
|----|-----------|---|---|--------|------------|
| CN | 105492332 | A | * | 4/2016 | ......... B65D 43/0225 |
| CN | 208713792 | U |   | 4/2019 |            |
| DE | 102005020217 | A1 |   | 11/2006 |         |
| DE | 102012013893 | A1 |   | 1/2014 |          |
| EP |   0849126 | B1 | * | 4/2003 | ........... B60R 21/205 |

(Continued)

OTHER PUBLICATIONS

Machine translation of EP0849126B1 (Year: 2003).*
(Continued)

*Primary Examiner* — Lee E Rodak
*Assistant Examiner* — Sangkyung Lee
(74) *Attorney, Agent, or Firm* — Ursula B. Day

(57) ABSTRACT

A testing device for an airbag module includes a support structure to which an airbag module containing an airbag can be fastened, the support structure forming a passage which can be penetrated by the airbag, at least one lid movably fastened to the support structure by fastening means between a closing position in which the lid closes the passage and an open position in which the passage is opened, and a closure device that closes the lid in the closing position by applying a closing force to the lid, wherein the lid comprises at least one first force sensor measuring the opening force applied to the lid by the airbag when moved out of the closed position by the airbag.

11 Claims, 2 Drawing Sheets

(56) References Cited

FOREIGN PATENT DOCUMENTS

| EP | 0849126 B1 * | 5/2013 | ............... G01C 9/00 |
|----|--------------|--------|---------------------------|
| KR | 20050029838 A1 | 3/2005 | |
| KR | 20060025054 A | 3/2006 | |
| KR | 20080026815 A1 | 3/2008 | |

OTHER PUBLICATIONS

Machine translation of CN208713792U (Year: 2019).*
Machine translation of DE102012013893A1 (Year: 2014).*
Machine translation of CN 105492332A (Year: 2016).*
European Search Report issued by the European Patent Office in corresponding European Patent Application EP 20 17 8 227.
Translation of European Search Report issued by the European Patent Office in correspondine European Patent Application EP 20 17 8 227.

* cited by examiner

TESTING DEVICE FOR AN AIRBAG MODULE

CROSS-REFERENCES TO RELATED APPLICATIONS

This application claims the priority of European Patent Applications Serial No. 20 153928.5, filed Jan. 27, 2020 and 20 178227.3, filed Jun. 4, 2020 pursuant to 35 U.S.C. 119(a)-(d), the subject matter of which is incorporated herein by reference.

BACKGROUND OF THE INVENTION

The present disclosure relates to a testing device for an airbag module.

The airbags of a vehicle, in particular the passenger airbag, are arranged in a folded way inside an airbag module located invisibly to the vehicle passenger. In case of passenger airbags they are mounted behind the instrument panel. The instrument panel comprises an airbag cover, also referred to as airbag flap closing a chute channel mainly defined by the airbag module. The airbag module comprises a gas generator that when triggered provides high pressure gas that is introduced into the airbag which is thereby inflated. The airbag cover of the instrument panel is subsequently torn open, so that the airbag can enter the passenger compartment where it inflates to its maximum size to protect the passenger in case of an accident. When triggered a dynamic interaction is created between the airbag cover and the airbag exiting the chute channel.

In order to achieve optimum functionality for the airbag in case of an accident it is necessary that the airbag system is adapted to the installation situation of the instrument panel. To develop optimized airbag systems expensive development processes including the instrument panels thus need to be carried out.

Good test results can be generated by using prototype instrument panels. However, the use of prototype instruments is very costly since in each test the airbag cover of the instrument panel is torn open and thus the instrument panel destroyed so that it cannot be used for further tests anymore.

DE 10 2005 020 217 A1 discloses a testing device for an airbag system in which the airbag module is located behind an airbag cover delimited by cut-outs from the rest of the instrument panel. The cut-outs only partially penetrate the outer layer and the inner layer of the instrument panel and thus form breakage points at which the airbag cover is released from the instrument panel during an airbag shot. After testing the test device has to be costly repaired or completely replaced.

DE 10 2012 013 893 A1 discloses a testing device for an airbag module which can be used without the need of employing an instrument panel. The testing device comprises a plate to which an airbag module containing an airbag can be fastened, the plate forming a passage which can be penetrated by the airbag, a lid rotatably fastened to the plate between a closing position in which the lid closes the passage and an open position in which the passage is opened, and a closure device that closes the lid in the closing position. The angle the lid is forming with the plate in the initial position can be adjusted by cantilever beams. This angle and the angular velocity of the lid are used to simulate different installation situation of the instrument panel.

However, the testing device according to DE 10 2012 013 893 A1 is only partially be suited to simulate the installation situation of different instrument panels.

Further testing devices are disclosed in CN 202710330 U, KR 2005 0029838 A1 and KR 2008 0026815 A1.

SUMMARY OF THE INVENTION

It is an object of an embodiment of the present disclosure to present a testing device which delivers cost-efficient and reliable results by which airbag systems can be optimized considering a given instrument panel and a given installation situation without destroying the testing device. Moreover, it is one task of one embodiment of the present disclosure to present a testing device able to identify the airbag module out of a plurality of available airbag modules that works best with a given instrument panel.

This object is solved according to an embodiment of the testing device for an airbag module that comprises a support structure to which an airbag module containing an airbag can be fastened, the support structure forming a passage which can be penetrated by the airbag, at least one lid movably fastened to the support structure by fastening means between a closing position in which the lid closes the passage and an open position in which the passage is opened, and a closure device that closes the lid in the closing position by applying a closing force to the lid, wherein the lid comprises a number of first force sensors measuring the opening force applied to the lid by the airbag when moved out of the closed position by the airbag.

For the sake of conciseness, reference is made to one lid only in the following. However, the description equally applies to embodiments comprising two or more lids.

The main difference between the testing device according to the present application and the testing devices known from the prior art is that the lid is or the lids are provided with one or more first force sensors. It was found under constant conditions by using the opening force applied that different airbag modules can be compared to each other and the lid when the airbag module is triggered and the airbag inflated. It is not necessary to use a real instrument panel. The testing device can be re-used after one test without significant effort. The passage simulates at least a part of a chute channel guiding the airbag upon inflation. Differences between the tested airbag modules can be identified.

According to another embodiment the lid comprises at least one acceleration sensor measuring the acceleration of the lid when moved out of the closed position by the airbag. The acceleration sensor can measure accelerations in three axes. Thereby the direction of the lid movement in correlation with the forces measured by the force sensors can be evaluated. The processes upon airbag inflation can be described in more detail and with a higher accuracy. The data obtained by the airbag sensor supports the evaluation of the testing device.

In a further embodiment the lid is fastened to the support structure by a number of flexible belts, the belts cooperating with a number of second force sensors measuring the hinge force applied to the belts when the lid is moved out of the closed position by the airbag. The belts serve for simulating the movement of the airbag cover of a given instrument panel. In the testing device disclosed in DE 10 2012 013 893 A1 the lid is fastened to the support plate by means of a hinge joint defining a rotation axis around which the lid moves when the airbag is triggered. However the airbag cover of a given instrument panel does not rotate around a well-defined rotation axis when the airbag is triggered. As the movement of the airbag cover has a big impact on the inflation of the airbag a precise simulation is essential. Due to the fact that in DE 10 2012 013 893 A1 the lid moves around a fixed rotation axis only the angular velocity of the lid can be measured which was found to be of limited significance. In contrast to that the opening forces and the hinge forces measured by the first and the second sensors, respectively, were found to be a better parameter to characterize the interaction between the airbag modules and the instrument panel. In particular the airbag modules optimally interacting with the instrument panel can quickly and cost-efficiently be identified out of a large number.

Moreover, it is possible to fasten the lid to the support structure such that they form a hinge-like structure. In the vehicle the airbag cover is fastened to the remaining instrument panel by a hinge-like connection. In particular by means of the belts to simulate the way the airbag cover is fastened to the instrument panel.

Belts of different flexibility are available in the market. The flexibility can be chosen such that the movement of the airbag cover can be simulated better compared to known testing devices. The quality of the results can thereby be increased.

Moreover, the second force sensors generate information on the forces acting on the belts. In order to avoid injury of the passengers of the vehicle it is of high significance that the airbag cover does not come loose. The information generated by the second force sensors can be used for the layout of the connection between the airbag cover and the instrument panel.

In another embodiment the belts at least partially enclose the lid. It was found that the fixation of the lid is better when the belts at least partially enclose the lid. The quality of the results can be further improved.

In accordance with another embodiment, the testing device comprises a first lid that is fastened to the support structure by a first fastening means and a second lid that is fastened to the support structure by a second fastening means. As mentioned above, the testing device is amongst other reasons used to identify the airbag module out of a plurality of available airbag modules that works best with a given instrument panel. An increasing number of instrument panels have two or more airbag covers per airbag module, mainly for following reasons: Compared to instrument panels having one airbag cover per airbag module the airbag covers of instrument panels comprising two or more airbag covers per airbag module are smaller in size. As a consequence the weight of one airbag cover is also smaller such that the energy the airbag has to impose on the airbag cover for opening is smaller. The influence of the covers on the inflation of the airbag is smaller. Moreover, some of the airbag modules are placed in the vicinity of vehicle components like windscreens. The bigger the airbag cover is, the more likely they will impinge on the vehicle components upon opening. The inflation of the airbag may thus be negatively affected. Thus the arrangement of the airbag module within the instrument panel is subject to certain limits. When the airbag covers are smaller, these limits are also reduced. As a consequence the freedom of choice regarding the arrangement of the airbag module within the instrument panel is enhanced.

In a further embodiment, the testing device comprises means for adjusting the closing force. The possibility to adjust the closing force also serves for better simulating the movement of the airbag cover in case the airbag is triggered.

In another embodiment, the means comprise a number of magnets acting between the support structure and the closure device. The magnets, in particular permanent magnets, provide the possibility to adjust the closing force very easily. It is also possible to change the closing force in the course of the movement of the lid such that the simulation of the movement of the airbag cover of a given instrument can be improved.

In a further embodiment, the lid is at least partially made of carbon fiber reinforced plastic. The use of carbon fiber reinforced plastic enables a lightweight layout of the lid at high rigidity. The weight of the lid also has a big impact on the forces acting between the airbag and the airbag cover so a lightweight layout also contributes for an improved simulation of the opening process of the airbag cover when the airbag is triggered.

In another embodiment, the testing device comprises a high-speed camera. A high-speed camera facilitates following the movement of the lid and the way the airbag is inflated. Starting points to improve the inflation of the airbag may be identified by using the high-speed camera.

In a further embodiment, the lid is at least partially made of a transparent material. In particular when using a high-speed camera the way the airbag inflates before or during its interaction with the lid can be followed.

In another embodiment, the testing device comprises a catchment device for receiving the lid in the open position. The catchment device may comprise a dampening element such as a cushion or an air buffer. The lid is moved very quickly when the airbag is inflated. The catchment device serves for absorbing the kinetic energy of the lid to prevent the damage or destruction of the lid and the support structure. Moreover, noisy impacts of the lid on the support structure are prevented.

In a further embodiment, the support structure comprises a number of standardized mounting points for fastening the airbag module to the support structure. The majority of airbag modules available in the marked comprise standardized fixing points by which they are fixed to the instrument panel or other structures of the vehicle. By using standardized mounting points many airbag modules can be fastened to the support structure of the present testing device without the need to adjust the testing device. The testing device is thus very versatile.

BRIEF DESCRIPTION OF THE DRAWING

Other features and advantages of the present invention will be more readily apparent upon reading the following description of currently preferred exemplified embodiments of the invention with reference to the accompanying drawing, in which.

The present disclosure is described in detail with reference to the drawings attached wherein.

DETAILED DESCRIPTION OF PREFERRED EMBODIMENTS

Figure 1A:
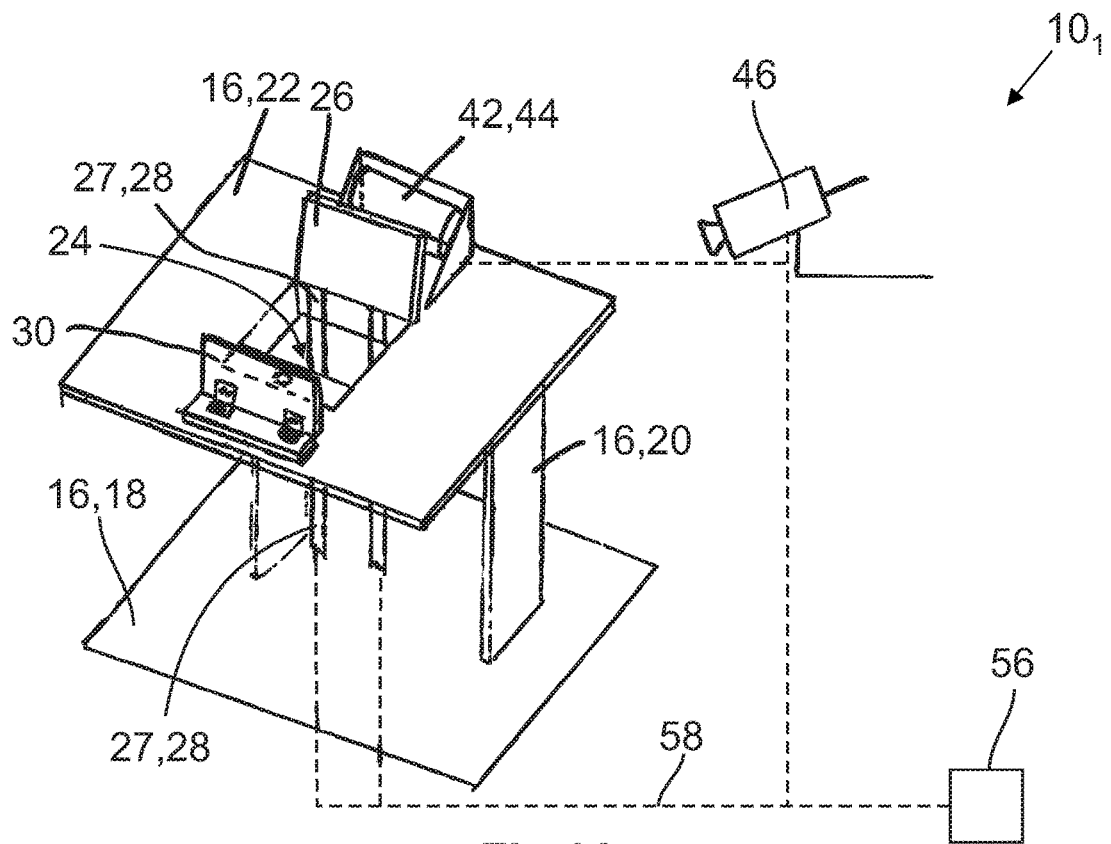
FIG. 1A is a principle perspective sketch of a first embodiment of a testing device according to the present application.
Figure 1B:
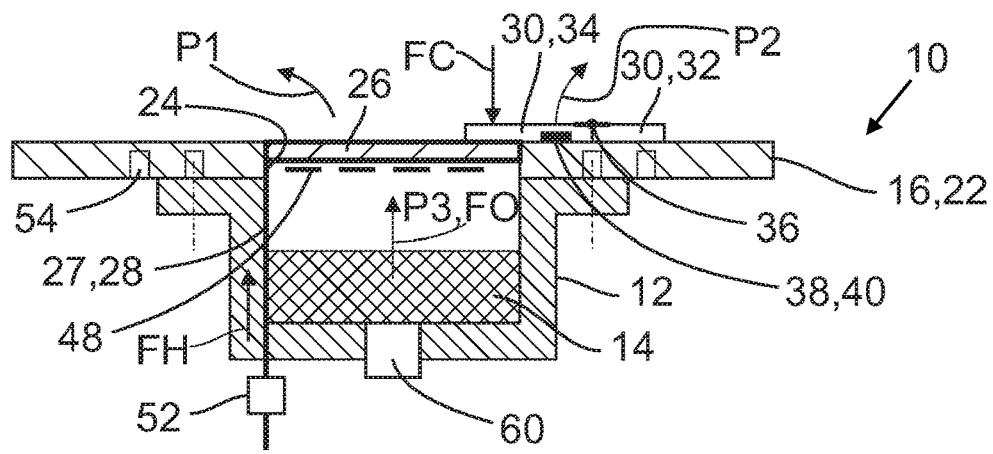
FIG. 1B is a principle partial sectional and not scaled view through the testing device shown in FIG. 1A.

The following description relates to FIGS. 1A and 1B which both show an embodiment of a testing device $10_1$ for testing an airbag module 12 hosting a folded airbag 14 (see FIG. 1B). The testing device 10$_1$ comprises a support structure 16 which is composed of a bearing plate 18, a number of pillars 20 fastened to the bearing plate 18 and a work plate 22 that rests on the pillars 20. The work plate 22 forms a passage 24 which has a substantially rectangular cross section. Furthermore the testing device 10$_1$ comprises one lid 26 that is movably fastened to the work plate 22 by fastening means 27 embodied as a number of flexible belts 28. As evident from FIG. 1B the belts 28 enclose the lid 26. The lid 26 can be moved between a closing position (see FIG. 1B) in which the lid 26 closes the passage 24 and an open position in which the lid 26 clears the passage 24 (FIG. 1A). The belts 28 define the movement of the lid 26 between the closing position and the open position. The belts 28 provide a hinge-like fastening of the lid 26 to the support structure 16. The movement of the lid 26, which is approximately a rotational movement, is indicated by the arrow P1 in FIG. 1B.

The testing device 10$_1$ further comprises a closure device 30 which applies a closing force FC to the lid 26 when the lid 26 is in the closing position. The closure device 30 comprises a first plate 32 and a second plate 34 that are movably connected to each other by a hinge joint 36. The first plate 32 is fixedly connected to the work plate 22 whereas the second plate 34 may be moved in a position in which it is partially overlapping the passage 24.

The testing device 10$_1$ is equipped with means 38 by which the closing force FC applied by the closure device 30 may be adjusted. In the embodiment shown in FIGS. 1A and 1B the means 38 comprise a magnet 40, in particular a permanent magnet 40 arranged in the second plate 34 of the closure device 30 that interacts with the work plate 22 that is made of metal, thereby creating the closing force FC that keeps the lid 26 in the closing position. The magnet 40 may be changed for adjusting the closing force FC. Alternatively the magnet 40 may be a permanent magnet such that the force acting between the lid 26 and the work plate 22 can be adjusted depending on the current applied.

Beyond that the testing device 10$_1$ is equipped with a catchment device 42 (FIG. 1A) which defines the open position of the lid 26 and comprises dampening elements 44 such as a cushion or an air buffer to avoid a hard impact of the lid 26 when reaching the open position. The testing device 10$_1$ is provided with a high-speed camera 46 by which the movement of the lid 26 and the inflation of the airbag 14 may be followed.

Figure 1C:
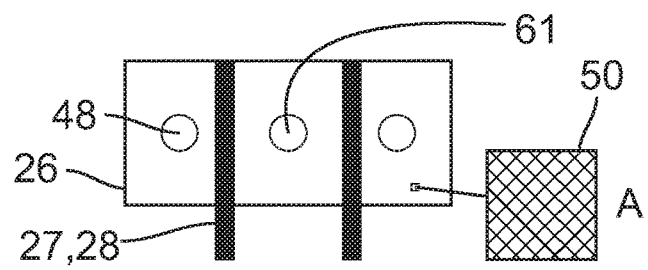
FIG. 1C is a separate not scaled bottom view of the lid of the testing device shown in FIGS. 1A and 1B.

FIG. 1C separately shows the lid 26 by means of a bottom view such that the surface facing to the airbag module 12 in the closing position is visible. One can see that the lid 26 is provided with a number of first force sensors 48, in this case with a variable number of first force sensors 48. However, the number of first force sensors 48 can be varied according to the relevant requirement. Beyond that the lid 26 is provided with one acceleration sensor 61. Again, the number of acceleration sensors can be varied if beneficial.

The lid 26 is made of carbon fiber reinforced plastic 50 which is symbolized by the crosshatching of area A of the lid 26 that is separately illustrated in a magnified way. It is possible to provide the lid 26 with transparent sections such that one may through the lid 26 and see the folded airbag 14 when the lid 26 is in the closing position.

Referring to FIG. 1B the testing device 10$_1$ comprises second force sensors 52 that interact with the belts 28. Moreover, the support structure 16 is equipped with a number of mounting points 54 by which the airbag module 12 may be fastened to the work plate 22. In this case the airbag module 12 is fastened to the work plate 22 by means of screws (not shown). The mounting points 54 are standardized such that the majority of airbag modules 12 available in the marked may be fastened to the work plate 22 without further adjustments.

A computer 56 is connected to the first force sensors 48, the second force sensors 52 and the high-speed camera 46 by means of cables 58. A wireless connection may also be conceivable. The computer 56 may also be connected to the airbag module 12, the permanent magnet and other components of the testing device 10$_1$ (not shown).

The testing device 10$_1$ is used as follows: In the initial state that is shown in FIG. 1B the lid 26 is in the closing position. The second plate 34 of the closure device 30 is flush with the first plate 32 and keeps the lid 26 in the closing position by means of the closing force FC generated by the magnet 40 arranged in the second plate 34 and interacting with the work plate 22.

The airbag module 12 is now triggered, e.g. by a corresponding signal generated by the computer 56. A gas generator 60 of the airbag module 12 generates pressurized gas which is introduced into the airbag 14, thereby inflating the airbag 14. Upon inflation the airbag 14 expands along the direction indicated by the arrow P3 in FIG. 1B and abuts on the lid 26. The opening force FO the airbag 14 imposes on the lid 26 is measured by the first force sensors 48. As in this embodiment a variable number of force sensors are arranged on the lid 26 the force distribution over the lid 26 may be determined.

In case the opening force FO the airbag 14 imposes on the lid 26 is sufficiently high the lid 26 moves into the open position, thereby moving the second plate 34 of the closure device 30 relative to the first plate 32 as indicated by the arrow P2 in FIG. 1B. In the open position the lid 26 is received by the catchment device 42 as approximately shown in FIG. 1A. For the sake of clarity the airbag 14 is not shown in FIG. 1A. The bulk of the airbag 14 penetrates the passage 24 such that the airbag 14 can be fully inflated above the work plate 22. The testing device 10$_1$ reaches its final state once the airbag 14 is deflated after full inflation.

The deflated airbag 14 and the triggered airbag module 12 can easily be removed and be replaced by an untriggered airbag module 12. The lid 26 and the second plate 34 may be moved back to the initial state as shown in FIG. 1B without significant effort.

The movement of the airbag 14, of the lid 26 and of the second plate 34 during the inflation of the airbag 14 may be monitored by the high-speed camera 46. The forces acting on the belts 28 during the inflation may be measured by the second force sensors 52. These forces are referred to as hinge forces FH. The hinge forces FH are an important parameter to estimate whether the airbag cover will stick to the instrument panel or not when the airbag inflates. As mentioned, the opening forces FO the airbag 14 imposes on the lid 26 can be measured by the first force sensors 48. These data can be processed and analyzed by the computer 56 such that different airbag modules 12 may be representatively compared to each other within a short time using the same testing device 10$_1$.

Figure 2:
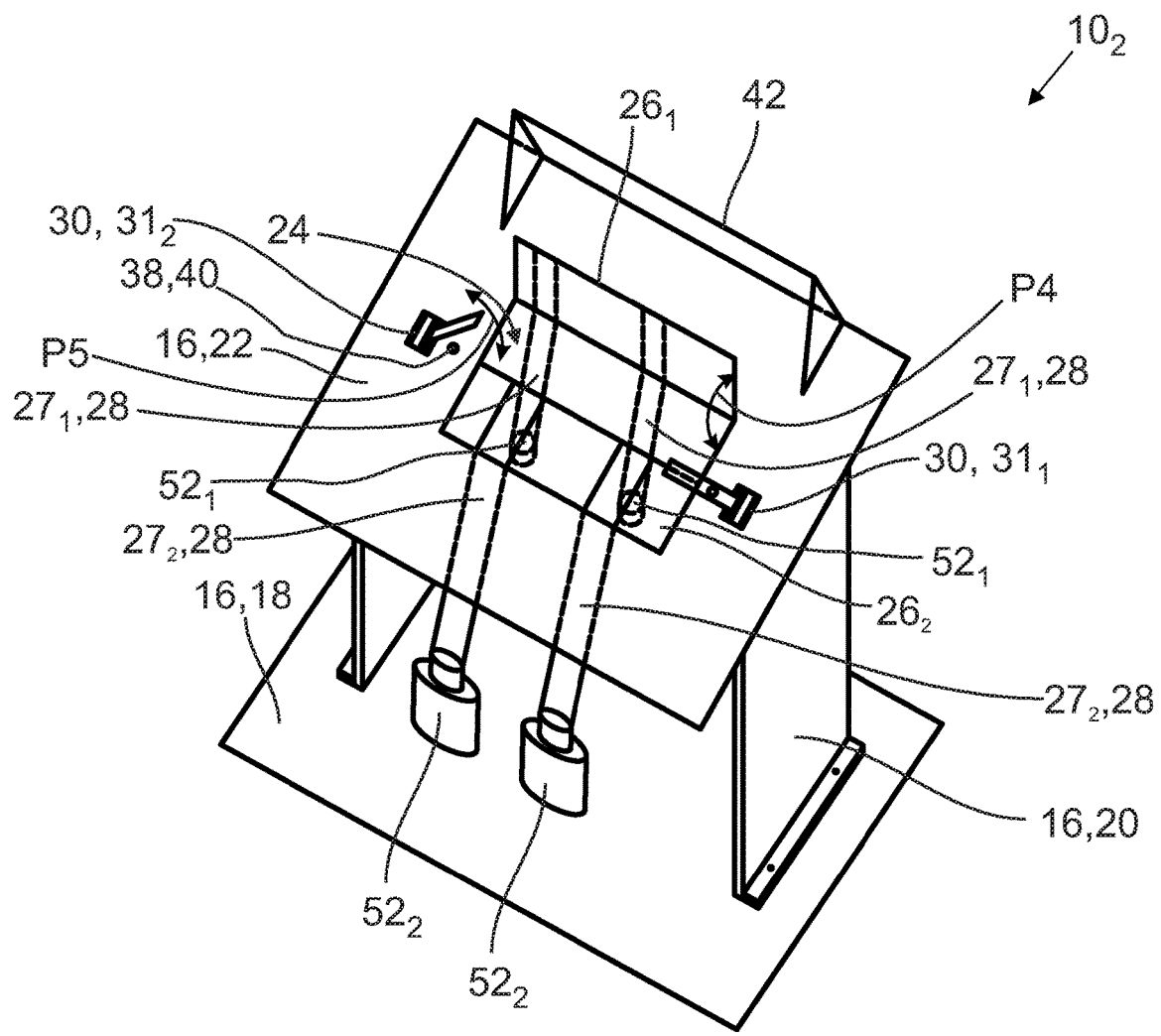
FIG. 2 is a principle perspective sketch of a first embodiment of a testing device according to the present application.

FIG. 2 shows a perspective principle view of a second embodiment of the testing device 10$_2$. The basic construction of the testing device 10$_2$ according to the second embodiment is the same as of the testing device 10$_1$ of the first embodiment. Thus, only the differences will be discussed in the following.

The passage 24 of the support structure 16 is covered by a first lid 26$_1$ and a second lid 26$_2$. The first lid 26$_1$ is fastened to the support structure 16 by two first fastening means 27₁ whereas the second lid 26₂ is fastened to the support structure 16 by two second fastening means 27₂. The fastening means 27₁, 27₂ can be designed as described with reference to the first embodiment. The way the first lid 26₁ moves when the airbag 14 is inflating is indicated by the arrow P4.

It is worth mentioning that the first fastening means 27₁ is equipped with a first group of second force sensors 52₁ while the second fastening means 27₂ comprises a second group of second force sensors 52₂. In the second embodiment shown in FIG. 2 each group 52₁, 52₂ consists of two second force sensors 52. The number of second force sensors 52 can be varied if considered beneficial.

The closure device 30 comprises a first sub-unit 31₁ and a second sub-unit 31₂. They are arranged such that they partially cover the first lid 26₁ and the second lid 26₂ when in the closing position. The way the second sub-unit 31₂ is moving when the airbag 14 is inflating is indicated by the arrow P5.

For the sake of clarity, the computer 56 and the cables 58 are not shown. However, the accelerations and forces acting on the first lid 26₁ and the second lid 26₂ can be detected and analyzed in the same way as described for the first embodiment. One difference is that the behavior of the first lid 26₁ and the second lid 26₂ can be detected independent of each other.

Figure 3A:
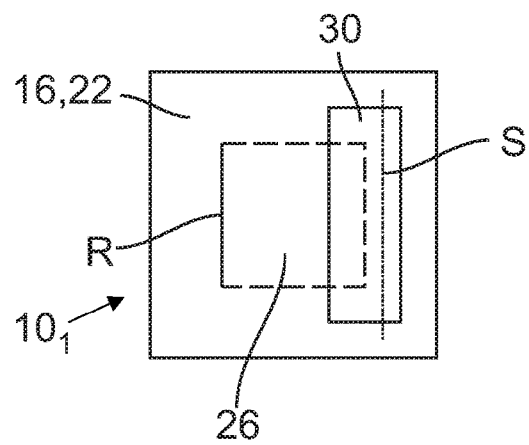
FIG. 3A is a principle and streamlined top view on the testing device according to the first embodiment.
Figure 3B:
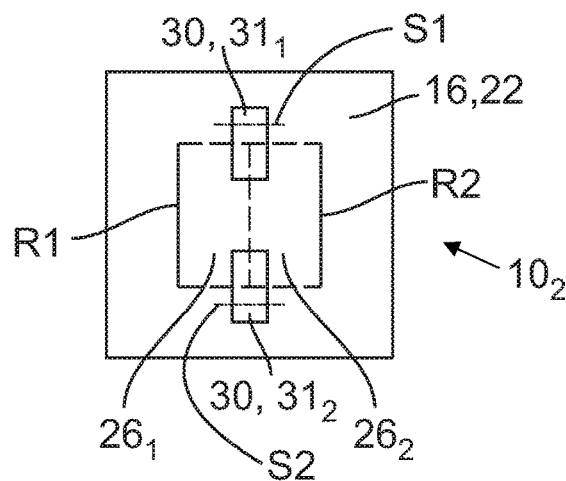
FIG. 3B is a principle and streamlined top view on the testing device according to the second embodiment.

FIG. 3A is a streamlined top view on the first embodiment of the testing device 10₁. FIG. 3B is a streamlined top view on the second embodiment of the testing device 10₂.

A pivot axis R for the lid 26, a first pivot axis R1 for the first lid 26₁ and a second pivot axis R2 for the second lid 26₂ are indicated by a solid line. The dashed line indicates the contact areas by which the lid, the first lid 26₁ and the second lid 26₂ are contacting or at least almost contacting the work plate 22 when in the closing position. While the contact area of the first embodiment of the testing device 10₁ is approximately U-shaped, the contact area of the second embodiment of the testing device 10₂ is approximately H-shaped.

When comparing FIGS. 3A and 3B it becomes apparent that the turning axis S around which the closure device 30 of the testing device 10₁ of the first embodiment rotates when the airbag is inflating is perpendicular to the turning axes S1, S2 of the closure device 30 according to the second embodiment of the testing device 10₂.

What is claimed is:

1. A testing device for an airbag module, comprising,
   a support structure, an airbag module, an airbag, the airbag module to be fastened to the support structure, said support structure including a passage for penetration by the airbag;
   a lid movably fastened to the support structure by a fastener between a closing position in which the lid closes the passage and an open position in which the passage is opened, and
   a closure device that closes the lid in the closing position by applying a closing force to the lid, said lid comprising at least one first force sensor measuring an opening force applied to the lid by the airbag when the lid is moved out of the closed position,
   wherein the lid is fastened to the support structure by at least one flexible belt, said belt co-operating with at least a second force sensor measuring the hinge force applied to the belt when the lid is moved out of the closed.

2. The testing device according to claim 1, wherein the lid comprises an acceleration sensor measuring the acceleration of the lid when the lid is moved out of the closed position by the airbag.

3. The testing device according to claim 1, wherein the belt, at least partially, encloses the lid.

4. The testing device according to claim 1, further comprising a first lid fastened to the support structure by a first lid fastener and a second lid fastened to the support structure by a second lid fastener.

5. The testing device according to claim 4, further including an adjustment device for adjusting, the closing force.

6. The testing device according to claim 5, wherein the adjustment device for adjusting the closing force comprising at least one magnet acting between the support structure and the closure device.

7. The testing device according to claim 1, wherein the lid is at least partially made of carbon fiber reinforced plastic.

8. The testing device according to claim 1, wherein the testing device comprises a high-speed camera.

9. The testing device according to claim 1, wherein the lid is at least partially made of a transparent material.

10. The testing device according to claim 1, further comprising a catchment device for receiving the lid in the open position.

11. The testing device according to claim 1, wherein the support structure further comprises a number of standardized mounting points for fastening the airbag module to the support structure.

* * * * *

UNITED STATES PATENT AND TRADEMARK OFFICE
CERTIFICATE OF CORRECTION

PATENT NO. : 11,630,033 B2
APPLICATION NO. : 17/154488
DATED : April 18, 2023
INVENTOR(S) : Erkan Bal et al.

It is certified that error appears in the above-identified patent and that said Letters Patent is hereby corrected as shown below:

In the Claims
In Column 8, Claim 1, Line 19: after "closed" add --position--

Signed and Sealed this
Ninth Day of April, 2024

Katherine Kelly Vidal
*Director of the United States Patent and Trademark Office*